United States Patent [19]

Keddie

[11] 4,428,266
[45] Jan. 31, 1984

[54] MITER SAW HAVING A SWIVEL HANDLE

[75] Inventor: Burton G. Keddie, Elm Grove, Wis.

[73] Assignee: Hempe Manufacturing Co., New Berlin, Wis.

[21] Appl. No.: 340,159

[22] Filed: Jan. 18, 1982

[51] Int. Cl.³ .................. B27B 21/00; B27G 5/02
[52] U.S. Cl. .................... 83/767; 145/108 B
[58] Field of Search ........... 83/766, 767; 145/108 B, 145/32 R, 108 R, 61 G

[56] References Cited

U.S. PATENT DOCUMENTS

| 262,341 | 8/1882 | Andrews | 145/108 B |
|---|---|---|---|
| 645,106 | 3/1900 | Leisifer | 83/767 |
| 945,828 | 1/1910 | Webster et al. | 145/108 B |
| 1,119,787 | 12/1914 | Pause | 145/108 B |
| 1,625,424 | 4/1927 | Pelletier | 83/767 |
| 1,808,611 | 6/1931 | Running | 83/767 X |
| 2,137,742 | 11/1938 | Jack | 145/108 B |
| 2,769,467 | 11/1956 | Wuhrmann | 83/767 |
| 2,953,175 | 9/1960 | Robinson, Jr. et al. | 145/108 B X |
| 4,079,763 | 3/1978 | Riley | 145/108 B X |

FOREIGN PATENT DOCUMENTS 94123 1/1939 Sweden .............. 145/108 B

*Primary Examiner*—Frank T. Yost
*Attorney, Agent, or Firm*—Wheeler, House, Fuller & Hohenfeldt

[57] ABSTRACT

A frame for holding a mitering saw blade has an end member in which there is a longitudinally extending hole whose axis is spaced from and parallel to the blade. The hole serves as a bearing. The saw handle has a shaft extending from it. The shaft is journaled in the bearing hole and secured against withdrawal. Thus, the frame and handle can swivel relative to each other about a longitudinal axis.

9 Claims, 4 Drawing Figures

MITER SAW HAVING A SWIVEL HANDLE

BACKGROUND OF THE INVENTION

This invention relates to miter saws.

Typical miter saw apparatus comprises a table having a flat horizontal bed and a vertical back that acts as a stop for the workpiece that is to be sawed. The back has a central opening through which a saw blade may pass for making a cut. Usually an arm is mounted beneath the table bed for swinging in a horizontal plane about a vertical axis. Post members that project upright from this arm at the front and rear of the table are provided with vertically movable guide members which are slotted for the blade of the saw to slide through and constrained to move back and forth in a nominally vertical plane. A user of mitering apparatus having these general characteristics often experiences a binding effect between the saw blade and its guide slots. Binding results primarily from the inability of the user to maintain perfect colinearity between the line of action on which the force is applied to the saw handle and the line of action of the saw blade. In other words, although it is the intention of the user to move his hand, the saw handle and the blade strictly longitudinally or linearly, sideways and torsional forces are usually developed which cause the saw blade to twist and bind in its guides. The problem is often more acute in sophisticated miter apparatus designs wherein guide tolerances are small and the size of the saw is large so that torsional or bending forces are amplified by the relatively long moment arm between the saw blade and the line of action of the handle. Moreover, since the joints in the wrist, elbow and shoulder of the human arm are not constrained to move together perfectly linearly, the natural tendency is to twist the saw about its longitudinal axis. This results in a counterforce being developed by the twisted saw and its frame which must be resisted by development of transverse forces in the joints which results in the user's arm being stressed and fatigued when an extended sawing operation is being carried out.

SUMMARY OF THE INVENTION

In accordance with the invention, the foregoing problems are substantially eliminated by providing a swivel connection between the manually engageable saw handle and the member or members which support the miter saw blade.

Illustrative embodiments of the invention will now be discussed in reference to the drawings.

DESCRIPTION OF A PREFERRED EMBODIMENT

Figure 1:
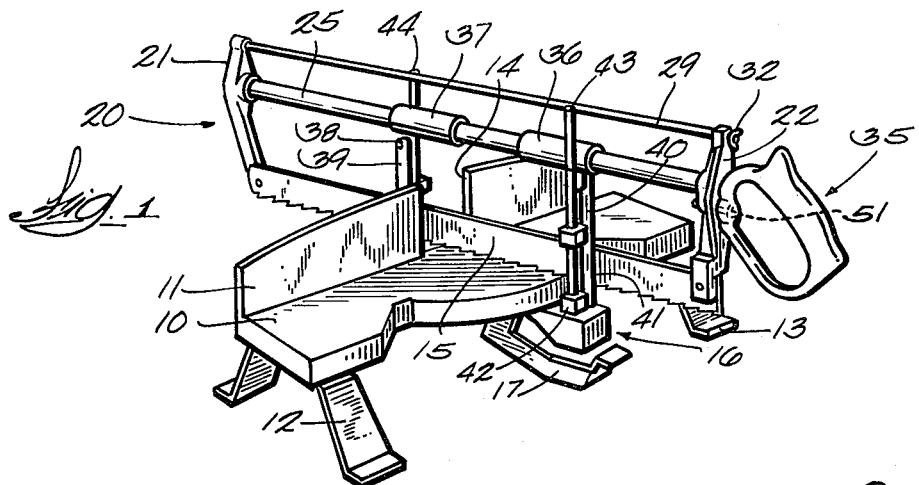
FIG. 1 is a perspective view of a mitering machine incorporating a saw blade supporting frame that is equipped with the new swivel handle.

A typical mitering machine in which the new swivel handle saw can be used is depicted in FIG. 1. The machine comprises a table having a horizontal surface 10 and an integral upstanding back wall 11. The table is supported on legs 12 and 13. The back wall 11 of the table is provided with a slot 14 through which a saw blade 15 may be oscillated for making a cut through a workpiece, not shown, which rests on the flat horizontal table surface 10 and is prevented from moving by letting it abut against back wall 11 as is well known.

An arm 16 is adapted for swinging under the table in a horizontal plane and around a vertical axis. The pivot axis for the arm is not visible in FIG. 1 but it will be understood to be located approximately in the plane of slot 14 or a little rearwardly thereof. As is customary, the arm 16 and the saw structure which it supports is adapted for being latched at selected angles for setting the saw blade 15 to cut through the workpiece at a corresponding angle. A lever 17 for operating the latch, not shown, is visible in FIG. 1. It will be understood that when manual force is applied to lever 17 it pivots downwardly to effect unlatching for allowing arm 16 to be swung to the desired horizontal angle. Release of lever 17 causes the latch to be set.

The saw frame structure is designated generally by the reference numeral 20. The frame comprises a pair of link members 21 and 22 at its opposite ends as shown in FIG. 1. Saw blade 15 spans between the lower ends of links 21 and 22. As can be seen in greater detail in FIG. 2, saw blade 15 is clamped against a flat tongue 23 of link 22 by means of a bolt and nut 24. The other end of the saw blade is similarly fastened to the lower end of link 21.

Figure 2:
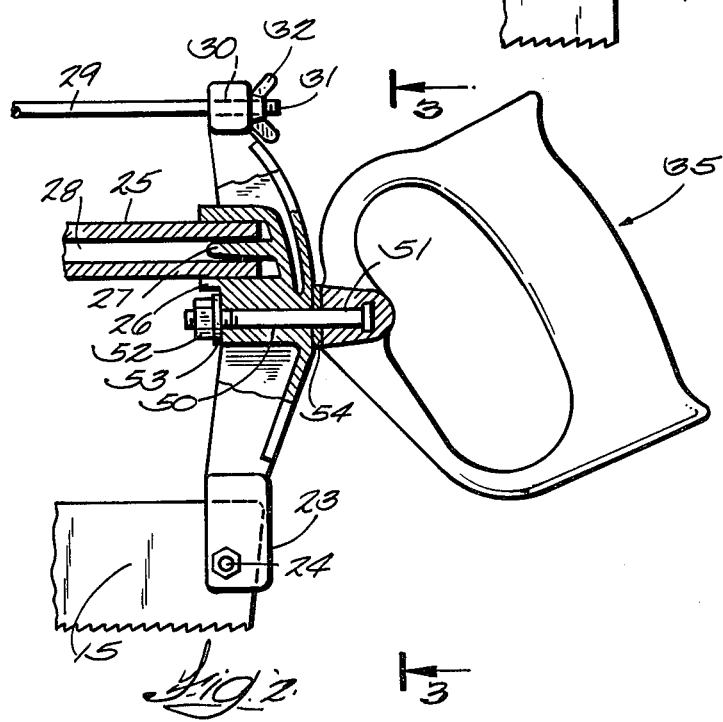
FIG. 2 is an enlarged fragmentary view, partially in section, of one end of the saw frame depicted in FIG. 1.

A long cylindrical member 25, which is preferably tubular, spans between end links 21 and 22 of the saw frame. As can be seen in FIG. 2, typical link 22 is provided with a socket 26 into which the end of the tubular member 25 fits rather snugly. A pin 27 extends integrally from the link member at the center of socket 26 and fits into the inside 28 of cylindrical member 25 to assist in stabilizng the latter.

As shown in FIG. 1, there is a tie-rod 29 joining the upper ends of link 21 and 22. As shown more clearly in FIG. 2, typically the tie-rod extends through a hole 30 and has a threaded end 31 on which there is a wing nut 32. The end of the tie-rod 29 opposite of the end which is shown in FIG. 2 connects with the upper end of link 21 in a similar fashion. By tightening wing nuts 32, the upper ends of the links can be urged towards each other by pivoting in the joint where the ends of tubular member 25 reside in the sockets 26 of the links. Tightening the wing nuts, therefore, causes a slight spreading of the lower ends of the links for putting the saw blade 15 in tension to thereby stiffen it.

The saw frame comprised of links 21 and 22, cylindrical member 25, tie-rod 29 and the blade 15 which is attached to the frame is oscillated back and forth for making a cut by applying a manual force to the frame by means of handle 35 which is attached to the frame as will be described in greater detail later. The saw frame is supported and guided for moving only in a longitudinal direction by having tubular member 25 slide through a pair of aligned linear bearing elements 36 and 37. These are essentially sleeve bearings. These bearings make pivot connections, such as at point 38 in FIG. 1, with upstanding columns 39 and 40. Typical column 39 is slotted at 41 for the saw blade 15 to pass through with relatively small clearance. Both columns 39 and 40 have guide bearings such as the one marked 42 fastened to them. Guide bearings 42 are slidable vertically on upright posts 43 and 44. These posts are mounted to horizontally swinging arm 16. With this sliding arrangement, the saw blade 15 can be raised to insert a workpiece under it and the frame and saw blade can settle down under the influence of gravity as the cut is made. The frame can also move up and down in a vertical plane on pivots 38.

Mitering machines having the general characteristics of the machine described thus far are known in the prior art. Mitering machines shown in U.S. Pat. Nos. 645,106 and 2,769,467 are examples.

A feature of the invention is to couple the manually engageable handle 35 to the saw frame or to a saw itself such that the handle may swivel about a longitudinal axis relative to the frame or blade.

One embodiment of a swivel handle arrangement can be seen most clearly in FIG. 2. The end link 22 of the saw frame is desirably die cast aluminum alloy and is provided with a longitudinally extending hole 50. A headed bolt 51 is embedded in die case handle 35 and does not turn in the handle in this embodiment. Bolt 51 serves as a shaft which is journaled for rotation in hole 50 of frame link 22. Bolt 50 has a threaded end on which a nut 52 is screwed against a washer 53 for holding the shaft bolt. A washer 54 is preferably interposed between handle 35 and the outer face of link 22. A washer made of steel or of plastic, such as nylon, may be used. Nut 52 is tightened sufficiently to create enough frictional force at the interfaces of the handle and the link and the washer to prevent the handle from swiveling relative to the saw frame unless a nominal torsional force is applied to the handle. When the nut 52 is tightened sufficiently to create the desired frictional drag, the nut is staked to retain it in a fixed position on the thread of shaft bolt 50. Thus, the nut turns with the shaft when the handle swivels.

With the swivel handle just described, torsional stress on the joints of the arm of the mitering saw user is relieved and the arm is allowed to move in its most natural line of action. Moreover, by providing for swiveling of handle 35, unintended transmission of torque or twisting or lateral bending forces from the handle to the saw blade 15 by way of the frame are avoided. Hence, the inclination for the saw blade 15 to bind is significantly diminished. However, downward force needed for cutting will always be applied in the plane of the blade because the axis of the shaft lies in the plane of the blade.

Figure 3:
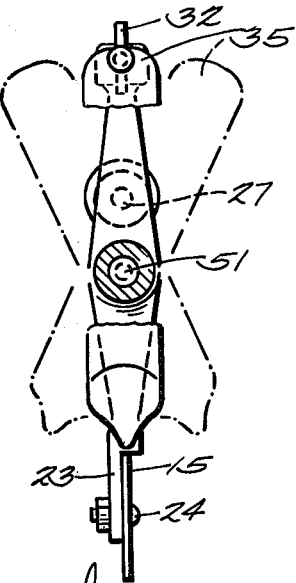
FIG. 3 is a vertical section taken on a line corresponding with 3—3 in FIG. 2.

FIG. 3 shows a broken away portion of the manually engageable saw handle 35 in solid lines. The phantom line representations of the handle 35 illustrate how the handle can swivel about the longitudinally extending axis of shaft 51 and how this axis lies in the vertical plane of the saw blade 15. It is not necessary to provide physical stops for limiting the angle through which the handle swivels. Regardless of how much it swivels, all torsional forces are relieved and only a single force vector for moving the saw frame and its blade exclusively in a longitudinal direction remains.

Figure 4:
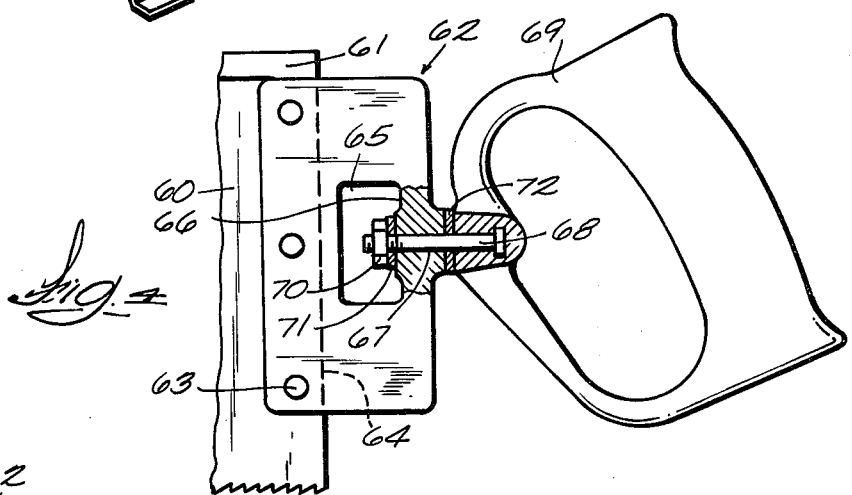
FIG. 4 is a fragmentary view, partially in section, of a miter saw, of the backsaw type, that is provided with a swivel handle.

An adaptation of a swivel handle to a common backsaw for mitering is depicted in FIG. 4. A fragment of the planar saw blade 60 is shown. The blade has a back rib 61 riveted to it for stiffening it. A yoke 62 is fastened to an end of blade 60 by means of rivets 63. In this illustration, the yoke is depicted as a prism of metal that has an end slot 64 coextensive with its length into which slot the end of the saw blade fits tightly. The yoke has a laterally extending opening 65. The opening provides an internal surface 66. The construction is similar to the previously described embodiment in that the yoke has a longitudinally extending hole 67 through which a shaft bolt 68 extends. The shaft bolt is die cast into manually engageable handle 69 so the shaft bolt is restrained against turning in the handle. The shaft, however, is journaled for rotation in hole 67 of the yoke. As in the previously described embodiment, shaft 68 has a threaded end on which there is a nut 70. A washer 71 is interposed between the nut and the yoke. A washer 72 is used at the interface between the yoke and the handle. Nut 70 is tightened sufficiently to create the desired frictional force at the interface of the handle and the yoke and then the nut is staked or otherwise prevented from turning on the threaded end of the shaft bolt 68.

As in the previously described embodiment, the swivel handle in the FIG. 4 embodiment will prevent transfer of any twisting force from the handle to the saw blade. Reverse twisting forces cannot be transferred from the saw blade to the handle and user's arm since such forces are negated by swiveling of the handle. Moreover, downward force needed for cutting is positively applied in the plane of the blade since the shaft axis and blade always lie in the same plane.

The described embodiments have the shaft fixed in the handle and rotatable in an end link of the saw frame in one case and in a yoke in the other case. It will be evident, however, that the shaft could be fixed in the frame link or yoke with a dowel pin, not shown, or other suitable means and the handle could be made rotatable on the shaft.

Although illustrative embodiments of swivel handle saw assemblies have been described in detail, such description is intended to be illustrative rather than limiting, for the invention may be variously embodied and is to be limited only by interpretation of the claims which follow.

I claim:

1. A saw assembly for mitering comprising:
   a member for being fastened to an end of a generally planar longitudinally extending extending saw blade,
   a manually engageable handle, and
   means including a shaft element for attaching said handle to said member in a manner that permits said handle to swivel continuously about a longitudinal axis of said shaft element lying in the same plane as the blade so that when said blade is being moved forth and back to perform cutting any torsional force imparted to said handle by the user's hand and arm following their natural line of action will not be transmitted to the blade but force applied transversely to said shaft element axis to induce cutting will only be transmitted through said shaft element in the plane of the blade.

2. A miter saw assembly comprising:
   a frame including longitudinally spaced apart members,
   means for attaching opposite ends of a generally planar longitudinally extending saw blade to the respective members for the saw blade to be held in a predetermined plane relative to the frame,
   a manually engageable handle,
   a longitudinally extending shaft fixed in a selected one of said handle or a frame member and journaled for rotation in the other of said handle or frame member for permitting said handle to swivel continuously about the longitudinal axis of said shaft lying in the same plane as the blade so that when said blade is being moved forth and back to perform cutting any torsional force imparted to the handle by the user's arm and hand following their natural line of action will not be transmitted to the blade but force applied transversely to said axis to induce cutting will only be transmitted through said shaft element in the plane of the blade.

3. The saw assembly as claimed in claim 2 wherein said one member of the frame is provided with a longitudinally extending bore in which said shaft is journalled for rotation and said shaft is fixed in the handle.

4. The saw assembly as claimed in claim 2 wherein the handle is cast on said shaft to fix the handle on the shaft and said one member of the frame has a longitudinally extending bore in which said shaft is journaled for rotation.

5. A miter saw comprising:
a saw blade having teeth formed in one of its longitudinally extending edges, a stiffening rib fastened to the other edges, and having longitudinally spaced apart ends,
a member fastened to one of the saw blade ends,
a manually engageable handle for moving said blade in opposite longitudinal directions,
a longitudinally extending shaft fixed in selected one of said handle or member and journaled for rotation in the other of said handle or member for permitting said handle to swivel continuously about the longitudinal axis of said shaft lying in the same plane as the blade so that when said blade is being moved forth and back to perform cutting any torsional force imparted to the handle by the user's arm and hand following their natural line of action will not be transmitted to the blade but force applied transversely to said axis to induce cutting will only be transmitted through said shaft element in the plane of the blade.

6. The miter saw as claimed in claim 5 wherein said member is provided with a longitudinally extending bore in which said shaft is journaled for rotation and said shaft is fixed in the handle.

7. The miter saw as claimed in claim 6 wherein the handle is cast on said shaft to fix the handle on the shaft and said member has a longitudinally extending bore in which said shaft is journaled.

8. Mitering apparatus comprising:
a table for supporting the material to be cut,
an arm mounted under the table for swinging in a horizontal plane about a vertical axis,
a pair of spaced apart post members projecting vertically upwardly from the arm,
guide means slidable on the respective post members, said guide means each having means defining a slot through which a saw blade travels for cutting material on the table,
a linear bearing element pivotally attached to each guide means at an end thereof remote from the slots, each bearing element having a bore whose axis is generally horizontally directed and are aligned with each other,
a frame structure comprising an elongated cylindrical member slidable axially through the aligned bores of said linear bearing elements, for performing a sawing operation, and upright link members, respectively, connected intermediate their ends to opposite ends of said cylindrical member,
a saw blade spanning between one pair of corresponding ends of said link members and passing through said slots,
means for urging the other corresponding ends of said links members towards each other to thereby spread said one pair of ends for holding said blade in tension,
a longitudinally extending shaft fixed in a selected one of said handle or a link member and journaled for rotation in the other of said handle or link member for permitting said handle to swivel continuously about the longitudinal axis of said shaft lying substantially in the plane of the blade to thereby prevent any twisting force that may be applied to said handle by the user's arm and hand following their natural line of action from being transmitted to the blade while at the same time compelling force applied transversely to said shaft axis to induce cutting to be transmitted through said shaft only in the plane of the blade.

9. The mitering apparatus as claimed in claim 8 wherein said handle is cast on the shaft to fix the handle on the shaft and said link has a longitudinally extending bore in which said shaft is journaled for rotation.

* * * * *